United States Patent
Haas

(10) Patent No.: US 9,824,167 B2
(45) Date of Patent: Nov. 21, 2017

(54) RESULT CACHING FOR IMPROVING STATISTICAL EFFICIENCY OF COMPOSITE SIMULATION MODELS

(71) Applicant: International Business Machines Corporation, Armonk, NY (US)

(72) Inventor: Peter J. Haas, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 14/743,888

(22) Filed: Jun. 18, 2015

(65) Prior Publication Data

US 2016/0371404 A1 Dec. 22, 2016

(51) Int. Cl.
G06F 17/50 (2006.01)
G06F 9/44 (2006.01)

(52) U.S. Cl.
CPC ............ G06F 17/5009 (2013.01); *G06F 8/35* (2013.01); *G06F 8/75* (2013.01); *G06F 8/76* (2013.01)

(58) Field of Classification Search
USPC ............ 703/2, 6, 22; 717/104; 707/608, 805
See application file for complete search history.

(56) References Cited

U.S. PATENT DOCUMENTS

| | | | | |
|---|---|---|---|---|
| 7,890,452 B2* | 2/2011 | Moore | ............... | G06Q 10/10 707/608 |
| 8,214,792 B2* | 7/2012 | Antoun | ............... | G06Q 10/04 717/100 |
| 8,386,996 B2* | 2/2013 | Prigge | ............... | G06Q 10/10 705/7.12 |
| 8,417,506 B2 | 4/2013 | Sturrock et al. | | |
| 8,548,777 B2 | 10/2013 | Sturrock et al. | | |
| 8,856,737 B2* | 10/2014 | Kand | ............... | G06F 8/35 717/118 |
| 9,158,503 B2* | 10/2015 | Misbhauddin | ............ | G06F 8/20 |

(Continued)

OTHER PUBLICATIONS

Harju, M., "Automated Construction of Dynamic Bayesian Networks in Simulation Metamodeling", Master's Thesis, School of Electrical Engineering, Apr. 16, 2013, pp. 1-77, Aalto University, Finland.

(Continued)

*Primary Examiner* — Thai Phan
(74) *Attorney, Agent, or Firm* — Sherman IP LLP; Kenneth L. Sherman; Hemavathy Perumal

(57) ABSTRACT

Embodiments of the present invention provide a method for result caching to improve the statistical efficiency of a composite model comprising a first component model and at least one other component model. The method comprises developing at least one metamodel for at least one component model of the composite model, computing a re-use factor that maximizes an asymptotic efficiency measure based on the metamodel, determining a number of executions to run for the composite model, and determining a number of executions to run for the first component model based on the re-use factor and the number of executions to run for the composite model. The number of executions to run for the first component model is fewer than the number of executions to run for the composite model. Each output generated from each execution of the first component model is cached and provided as input to another component model.

20 Claims, 10 Drawing Sheets

(56) References Cited

U.S. PATENT DOCUMENTS

| | | | | |
|---|---|---|---|---|
| 2007/0016557 A1* | 1/2007 | Moore | ............... | G06Q 10/10 |
| 2009/0007056 A1* | 1/2009 | Prigge | ............... | G06Q 10/10 |
| | | | | 717/104 |
| 2009/0018879 A1* | 1/2009 | Flaxer | ............... | G06Q 10/06 |
| | | | | 705/7.11 |
| 2011/0119651 A1* | 5/2011 | Utschig-Utschig | ....... | G06F 8/35 |
| | | | | 717/107 |
| 2012/0192143 A1* | 7/2012 | Elaasar | ............... | G06F 8/74 |
| | | | | 717/104 |
| 2015/0100942 A1* | 4/2015 | Misbhauddin | ............ | G06F 8/72 |
| | | | | 717/104 |

OTHER PUBLICATIONS

Tan, W.C., et al., "Splash: a platform for analysis and simulation of health", Proceedings of the 2nd ACM SIGHIT International Health Informatics Symposium, Jan. 28-30, 2012, pp. 1-10, ACM, Miami, United States.

* cited by examiner

RESULT CACHING FOR IMPROVING STATISTICAL EFFICIENCY OF COMPOSITE SIMULATION MODELS

The present invention generally relates to composite simulation models, and more particularly, to a system, method and computer program product for result caching to improve the statistical efficiency of composite simulation models.

BACKGROUND

Stochastic composite simulation models can be used to estimate performance measures for complex stochastic systems of systems. Composite simulation models are made up of loosely coupled component models that communicate by reading and writing datasets. Output data from upstream "source" component models are transformed as needed to a form suitable for input to downstream "target" component models. Such loose coupling and data transformation facilitates cross-disciplinary collaborative modeling and simulation as well as re-use of existing simulation models. Further, composition via loose coupling facilitates dealing with experts in different domains, as it avoids the need for massive re-coding or strict enforcement of a common platform, application programming interface (API), or communication protocol.

SUMMARY

Embodiments of the present invention provide a method for result caching to improve the statistical efficiency of a composite model comprising a first component model and at least one other component model. The method comprises developing at least one metamodel for at least one component model of the composite model, computing a re-use factor that maximizes an asymptotic efficiency measure based on the metamodel, determining a number of executions to run for the composite model, and determining a number of executions to run for the first component model based on the re-use factor and the number of executions to run for the composite model. The number of executions to run for the first component model is fewer than the number of executions to run for the composite model. Each output generated from each execution of the first component model is cached and provided as input to another component model.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to composite simulation models, and more particularly, to a system, method and computer program product for result caching to improve the statistical efficiency of composite simulation models. Embodiments of the present invention provide a method for result caching to improve the statistical efficiency of a composite model comprising a first component model and at least one other component model. The method comprises developing at least one metamodel for at least one component model of the composite model, computing a re-use factor that maximizes an asymptotic efficiency measure based on the metamodel, determining a number of executions to run for the composite model, and determining a number of executions to run for the first component model based on the re-use factor and the number of executions to run for the composite model. The number of executions to run for the first component model is fewer than the number of executions to run for the composite model. Each output generated from each execution of the first component model is cached and provided as input to another component model.

Figure 1A:
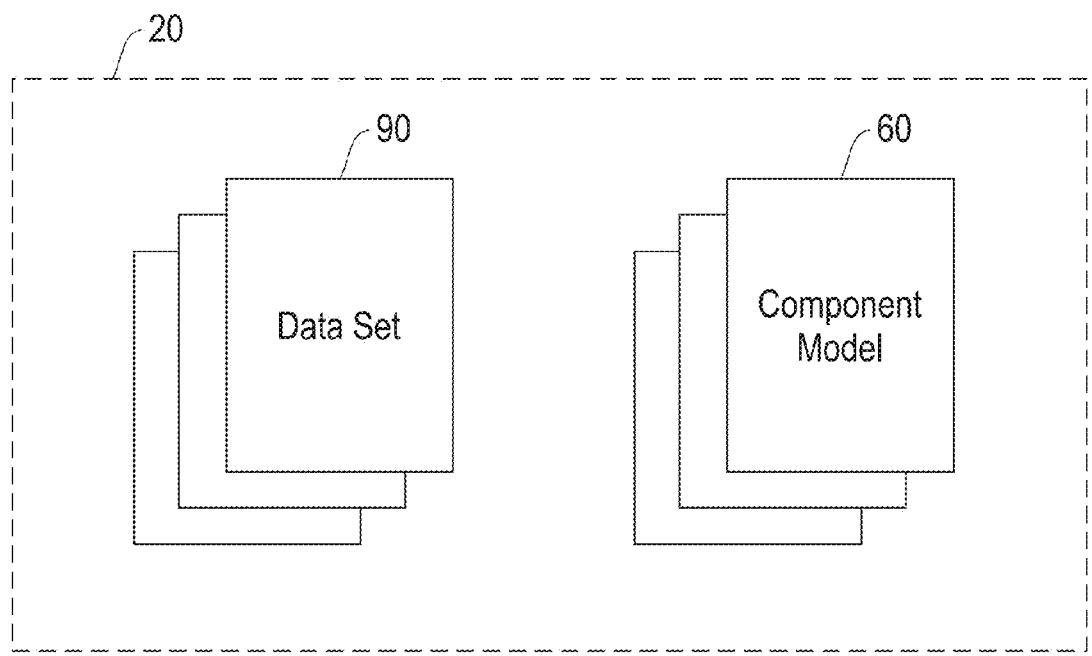
FIG. 1A illustrates an example composite modeling system.
Figure 1B:
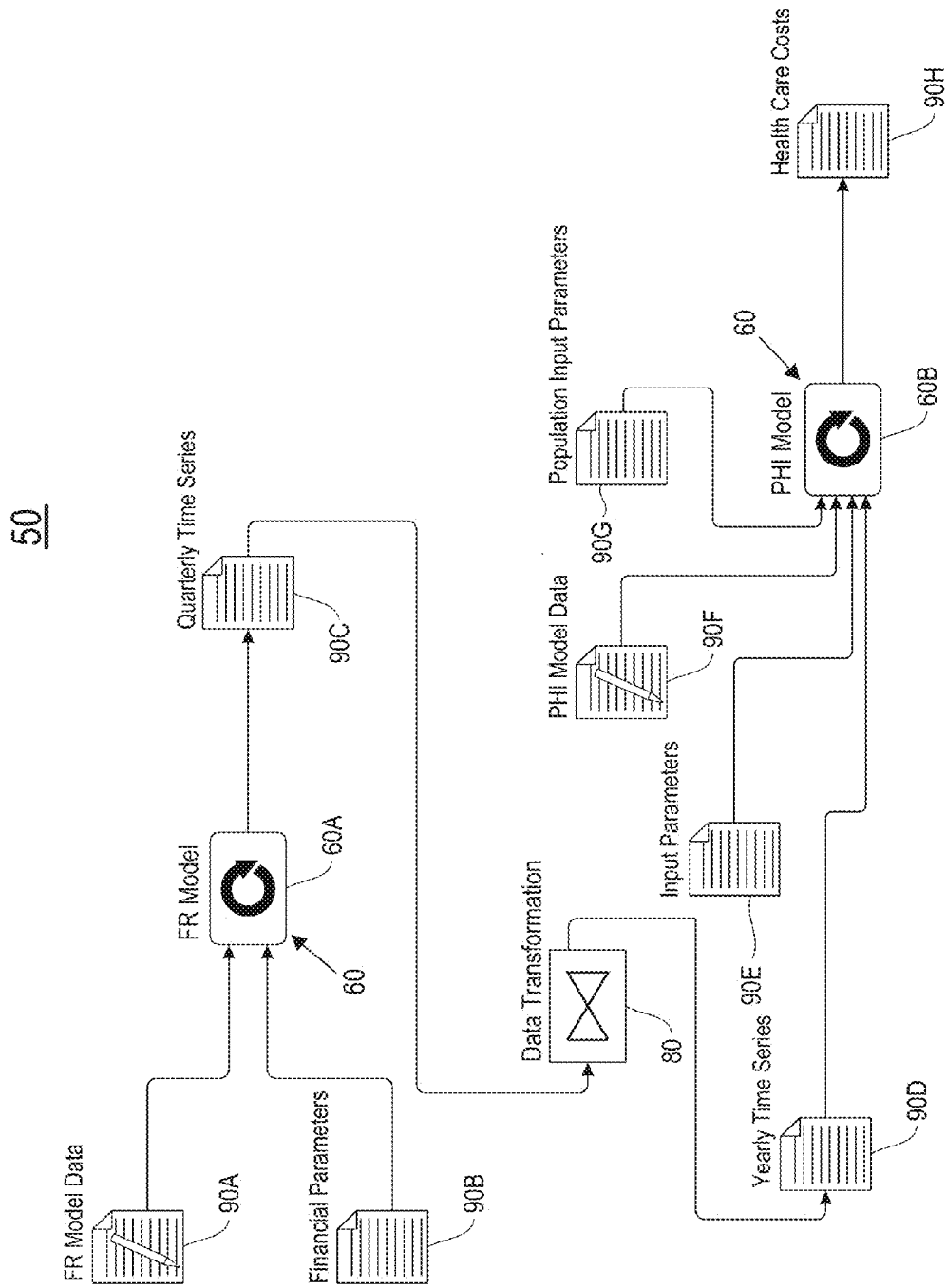
FIG. 1B illustrates a design environment showing an example composite model.

FIG. 1A illustrates an example composite modeling system 20. FIG. 1B illustrates a design environment showing an example composite model 50. The composite model 50 is an example composite simulation model. The composite model 50 may be created (i.e., designed) using a composite modeling system 20. An example composite modeling system 20 is Splash, as described in a publication titled "Splash: a platform for analysis and simulation of health" by Tan, W.

C., et al., published in Proceedings of the 2nd ACM SIGHIT International Health Informatics Symposium, 2012.

The composite modeling system 20 provides a design environment for combining existing heterogeneous component models 60 and data sets 90 to create composite simulation models 50 representing complex "systems of systems". The composite modeling system 20 facilitates cross-disciplinary collaborative modeling and simulation as well as re-use of existing models. In the composite modeling system 20, different component models 60 may reside on different platforms and are loosely coupled via data exchange. The component models 60 communicate by reading and writing data sets 90. The composite modeling system 20 maintains metadata about the component models 60 that captures key characteristics of the component models 60. The metadata maintained may be used to design data transformations, orchestrate composite-model execution, and so on.

For example, the composite model 50 shown in FIG. 1B is made up of two loosely coupled component models 60. Specifically, the composite model 50 is made up of a first component model 60A and a second component model 60B. The first component model 60A represents a financial rate (FR) model for providing a quarterly time series of annual healthcare inflation rate, general economic inflation rate, and discount rate. The first component model 60A may receive, as input, one or more data sets 90, such as a data set 90A relating to the FR model, and a data set 90B relating to financial parameters. The first component model 60A may provide, as output, a data set 90C representing a quarterly time series.

The second component model 60B represents a Predictive Health Institute (PHI) model for exploring economic performance of a wellness program for managing heart disease and diabetes under alternative payment models (e.g., capitated payments to the healthcare provider, outcome-based payments, or a combination of the two). The second component model 60B may receive, as input, one or more data sets 90, such as a data set 90D representing a yearly time series, a data set 90E relating to input parameters, a data set 90F relating to the PHI model, and a data set 90G relating to population input parameters. The second component model 60B may provide, as output, a data set 90H relating to health care costs.

Based on data sets 90A-90H relating to the component models 60A-60B, a data transformation component 80 of the composite modeling system 20 detects that output from the first component model 60A must be transformed to a form suitable for input to the second component model 60B. The data transformation component 80 transforms the quarterly time series data set 90C provided as output by the first component model 60A to a yearly time series data set 90D for input to the second component model 60B.

When a composite model 50 is created, the composite model 50 is repeatedly executed to explore system behavior. For example, expected values of various performance measures of interest (e.g., cost, profit, reliability, etc.) are estimated for one or more scenarios. Let θ denote an expected value of a performance measure of interest for a given scenario. An expected value θ of a performance measure of interest is defined in accordance with equation (1) provided below:

$$\theta = E[Y] \quad (1),$$

wherein Y denotes a random variable representing a noisy observation of the performance measure of interest.

Let n denote a number (i.e., quantity) of simulation replications (i.e., executions) of a composite model 50. Conventionally, to estimate an expected value θ of a performance measure of interest, n simulation replications of the composite model 50 are run to generate n independent and identically distributed observations $Y_0, Y_1, \ldots, Y_{n-1}$. The value of n is selected based on precision requirements and constraints on simulation costs. Running n multiple simulation replications of the composite model 50 comprises executing the entire composite model 50 n times, which in turn requires executing each component model 60 making up the composite model 50 n times. The observations generated from running n multiple simulation replications of the composite model 50 are then used to compute a point estimate $\theta_n$ for θ, as well as confidence intervals and other statistics of interest.

Figure 2A:
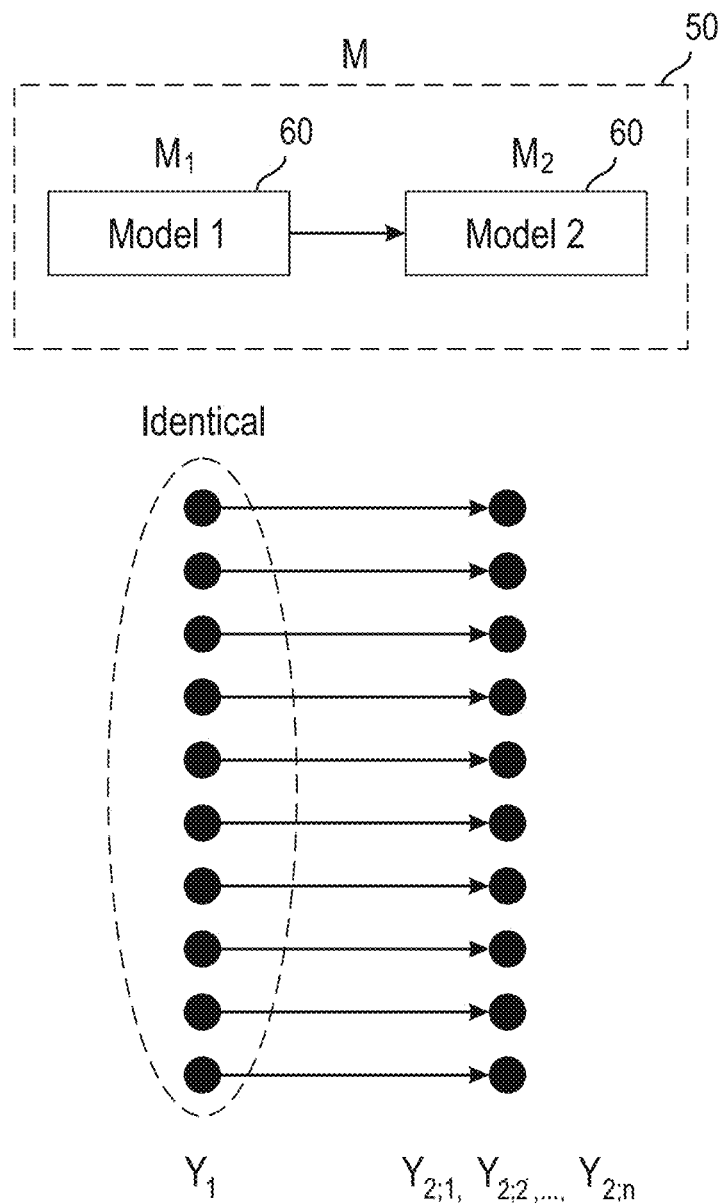
FIG. 2A illustrates running n multiple simulation replications of a composite model M.

For example, FIG. 2A illustrates running n multiple simulation replications of a composite model 50 denoted as M. The composite model M comprises a first component model 60 and a second component model 60 denoted as $M_1$ and $M_2$, respectively. An execution of the composite model M proceeds by first executing the component model $M_1$, which produces a random output denoted as $Y_1$. The random output $Y_1$ may be written to disk (e.g., hard disk drive 314 shown in FIG. 6). The execution of the composite model M proceeds by next executing the component model $M_2$. The component model $M_2$ is executed by taking the random output $Y_1$ as input (after appropriate data transformation), and generating a final output $Y_2$. Conventionally, to generate n independent and identically distributed observations $Y_{2;1}, Y_{2;2}, \ldots, Y_{2;n}$, the composite model M is executed n times, wherein each component model $M_1$, $M_2$ is executed n times each, resulting in a total of 2n component model executions.

Assume by way of an example that the component model $M_1$ is deterministic and the component model $M_2$ is stochastic. As the component model $M_1$ is deterministic, the same output $Y_1$ is produced every time the component model $M_1$ is executed. If the cost of executing the composite model $M_1$ is large relative to the cost of executing the composite model $M_2$, the resulting overall execution costs for the composite model M may be much larger than necessary.

One or more challenges may arise when running multiple simulation replications of a composite simulation model. Composite simulation models may be large and complex, and therefore slow to run; composing such models may result in long execution times. Further, many composite simulation models, such as climate models and massive-scale agent-based models, consume or produce huge amounts of data, such that inter-model data transformations can be time consuming.

Techniques for increasing simulation efficiency are essential for composite simulation modeling. Conventional efficiency improvement techniques may be applied, such as common random numbers (CRN), importance sampling, control variates, etc. Such conventional efficiency improvement techniques, however, may not be applicable. For example, CRN may not be applicable if one or more component models of a composite simulation model does not allow a user to specify seed values for pseudo-random number generators used by the component models.

Embodiments of the invention provide an efficiency-improvement technique involving result caching (RC) for improving statistical efficiency of composite simulation models. Specifically, to run n multiple simulation replications of a composite simulation model, embodiments of the invention execute certain component models fewer than n times, caching and re-using results as needed. The number of component model simulation replications is chosen to maximize an asymptotic efficiency measure that balances computation costs and estimator precision. In one embodiment, maximization of the asymptotic efficiency measure results in a simulation plan that approximately maximizes precision of estimates of one or more simulation-based performance measures of interest under a given/fixed computational budget (e.g., a budget that factors in bounds on CPU time, wall clock time, or other resources). In another embodiment, maximization of the asymptotic efficiency measure results in a simulation plan that approximately minimizes resource cost of estimating a performance measure of interest to a pre-specified precision.

Embodiments of the invention are applicable to composite simulation modeling. Embodiments of the invention may also complement conventional efficiency improvement techniques, such as CRN.

Embodiments of the invention are also applicable to composite analytics, wherein composite models may be more general than simulation models, and may include other kinds of models, such as optimization models.

Figure 2B:
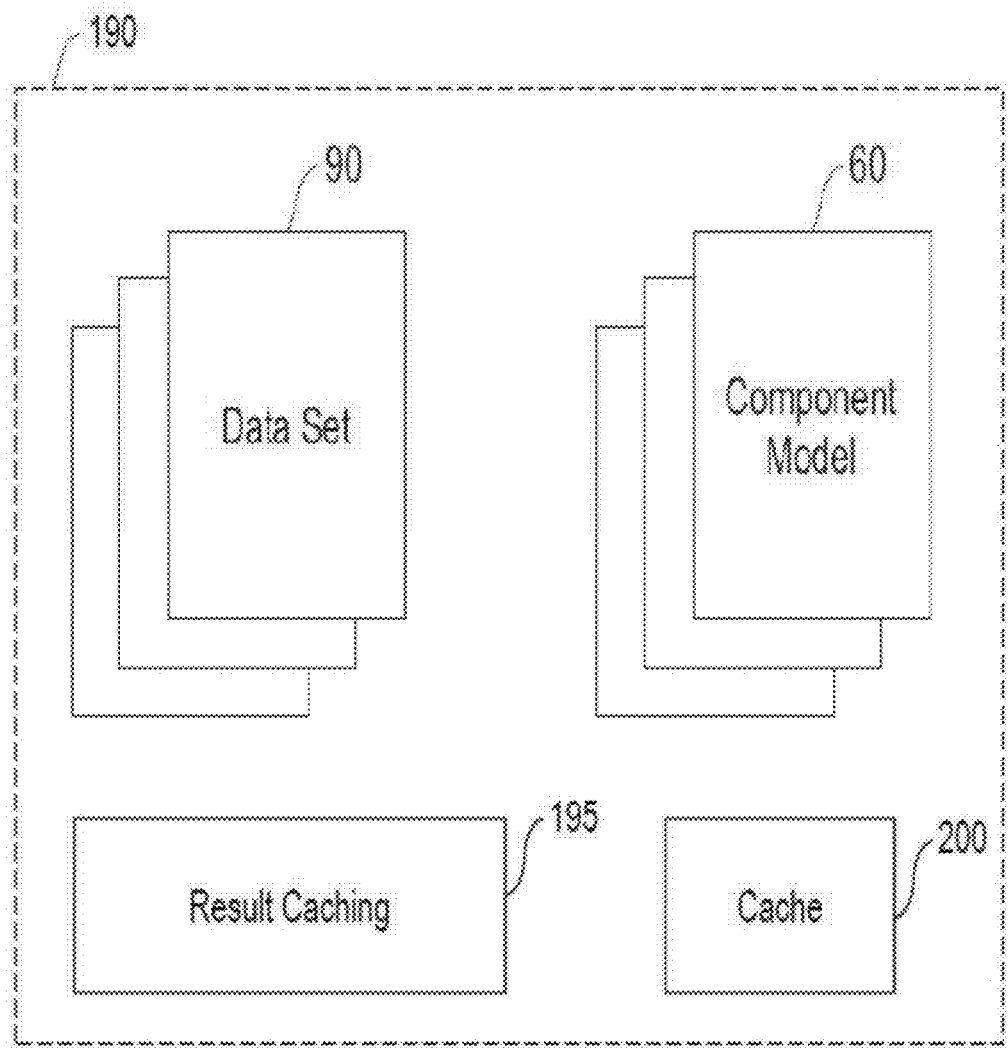
FIG. 2B illustrates an example composite modeling system providing an efficiency-improvement technique involving result caching to improve the statistical efficiency of composite simulation models, in accordance with an embodiment of the invention.

FIG. 2B illustrates an example composite modeling system 190 providing an efficiency-improvement technique involving result caching to improve the statistical efficiency of composite simulation models, in accordance with an embodiment of the invention. The composite modeling system 190 provides a design environment for combining existing heterogeneous component models 60 and data sets 90 to create composite simulation models 50 representing complex "systems of systems". The composite modeling system 190 also comprises a result caching unit 195 and a cache unit 200. To run n multiple simulation replications of a composite simulation model, the result caching unit 195 is configured to trigger execution of certain component models of the composite simulation model fewer than n times, wherein results are cached in the cache unit 200, and the cached results are re-used, as needed.

Figure 2C:
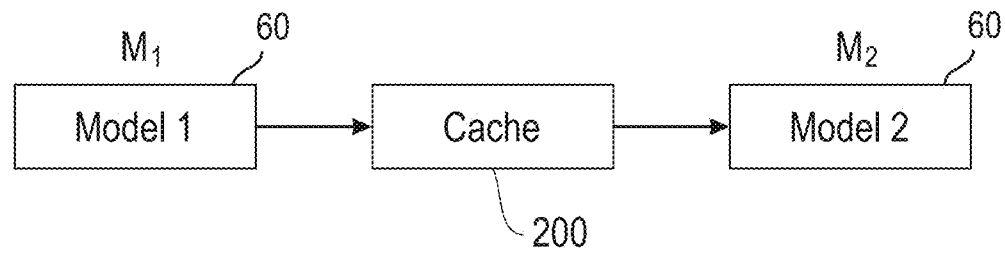
FIG. 2C illustrates applying result caching to the composite model in FIG. 2A using the example composite modeling system in FIG. 2B, in accordance with an embodiment of the invention.
Figure 2C:
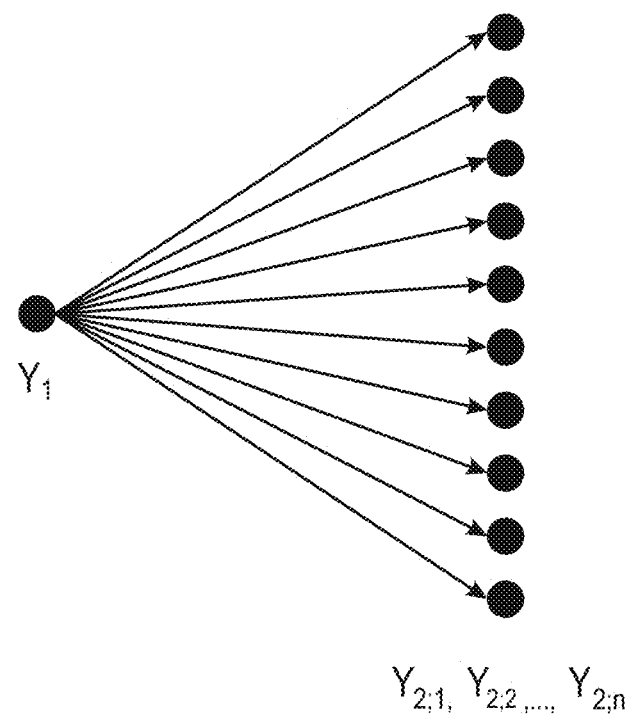

FIG. 2C illustrates applying result caching to the composite model M in FIG. 2A using the example composite modeling system 190 in FIG. 2B, in accordance with an embodiment of the invention. Rather than executing the deterministic component model $M_1$ for n times, the component model $M_1$ is executed only once, and the resulting output $Y_1$ is cached in the caching unit 200. The cached output $Y_1$ is then provided as input (after appropriate data transformation) to the stochastic component model $M_2$ during each of the n executions of the component model $M_2$. Executing the component model $M_1$ only once allows significant savings in execution costs.

Figure 3:
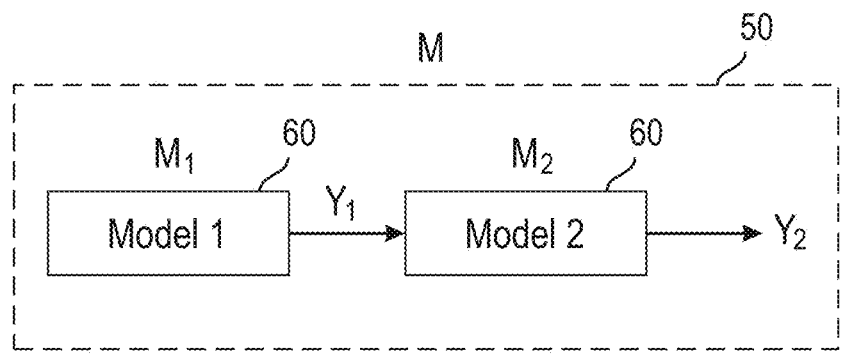
FIG. 3 illustrates applying result caching to a composite model using the example composite modeling system in FIG. 2B, wherein the composite model comprises multiple stochastic component models, in accordance with an embodiment of the invention.
Figure 3:
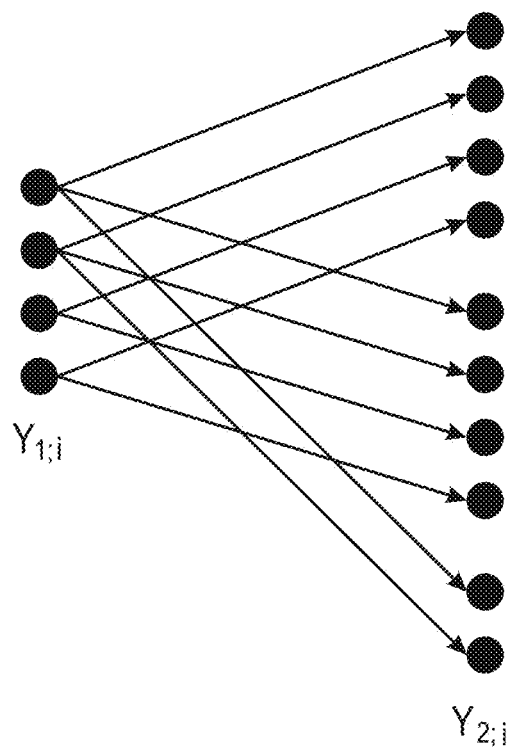

FIG. 3 illustrates applying result caching to a composite model 50 using the example composite modeling system 190 in FIG. 2B, wherein the composite model 50 comprises multiple stochastic component models 60, in accordance with an embodiment of the invention. As shown in FIG. 3, the composite model 50 is denoted as M. The composite model M comprises a first stochastic component model 60 and a second stochastic component model 50 denoted as $M_1$ and $M_2$, respectively. An expected value θ of output from the stochastic component model $M_2$ is defined in accordance with equation (2) provided below:

$$\theta = E[Y_{2;0}] \quad (2).$$

In this specification, let $m_n$ denote a number of simulation replications of the stochastic component model $M_1$ to execute. Let $\lceil x \rceil$ denote a smallest integer greater than or equal to x, and let $\lfloor x \rfloor$ denote a largest integer less than or equal to x. Let α denote a re-use factor. Let $Y_{1;i}$ generally denote an output (i.e., observation) generated from running a simulation replication of the stochastic component model $M_1$. Let $Y_{2;i}$ generally denote an output (i.e., observation) generated from running a simulation replication of the stochastic component model $M_2$.

For n simulation replications of the stochastic component model $M_2$, only $m_n$ simulation replications of the stochastic component model $M_1$ are executed. The number of replications $m_n$ is defined in accordance with equation (3) provided below:

$$m_n = \lceil \alpha n \rceil \quad (3),$$

wherein the re-use factor $\alpha \in (0,1]$.

In the example shown in FIG. 3, for ten (i.e., n=10) simulation replications of the stochastic component model $M_2$, only four (i.e., $m_n$=4) simulation replications of the stochastic component model $M_1$ are executed. All outputs generated from the $m_n$ simulation replication of the stochastic component model $M_1$ are cached in the cache unit 200.

To execute the n simulation replications of the stochastic component model $M_2$, the cached outputs are each used multiple times as inputs to the stochastic component model $M_2$. In a preferred embodiment, the re-use of cached outputs is implemented by repeatedly cycling through the cached outputs in a fixed order, such that each output $Y_{1;i}$ is used in approximately $n/m_n$ executions of the stochastic component model $M_2$. Cycling through the cached outputs as described produces a stratified sample of final outputs of the stochastic component model $M_2$ that maximizes estimator precision.

A point estimator $\theta_n$ for θ is computed in accordance with equation (4) provided below:

$$\theta_n = n^{-1} \sum_{i=1}^{n} Y_{2;i} \quad (4).$$

In one embodiment, the re-use factor α is selected to maximize an asymptotic efficiency measure that balances computation costs and estimator precision. The asymptotic efficiency measure allows principled trade-offs between precision of an estimate and computation costs of producing the estimate.

In this specification, let $C_n$ denote computation costs of generating n outputs from the stochastic component model $M_2$. The computation costs $C_n$ is computed in accordance with equation (5) provided below:

$$C_n = \sum_{j=1}^{m_n} \tau_{1;j} + \sum_{j=1}^{n} \tau_{2;j} \quad (5),$$

where $\tau_{i;j}$ denotes a random cost of producing $j^{th}$ observation of $Y_i$.

In this specification, let c denote a fixed computational budget, and let N(c) denote number of outputs of the stochastic component model $M_2$ that can be generated under the fixed computational budget c. The number of outputs N(c) is computed in accordance with equation (6) provided below:

$$N(c) = \max\{n \geq 0 : C_n \leq c\} \quad (6).$$

In this specification, let U(c) denote an estimate $\theta_{N(c)}$. The estimate U(c) is computed in accordance with equation (7) provided below:

$$U(c) = \theta_{N(c)} = N(c)^{-1} \sum_{j=1}^{N(c)} Y_{2;j} \quad (7).$$

If condition (8) provided below is satisfied:

$$E[\tau_1 + \tau_2 + Y_2^2] < \infty \quad (8)$$

the estimate U(c) has asymptotically a normal distribution with mean θ and estimation variance g(α)/c (i.e., the estimate U(c) is asymptotically N(θ,g(α)/c)) as the fixed computational budget c becomes larger.

In this specification, let $Var[Y_2]$ represent variance of random output of the component model $M_2$. Let $Cov[Y_2,\tilde{Y}_2]$ represent covariance between two random outputs of the component model $M_2$, wherein the two random outputs result from the component model $M_2$ taking as input a same output from the component $M_1$. Let $E[\tau_1]$ represent expected cost of executing a single run of component model $M_1$ to obtain an output $Y_1$. Let $E[\tau_2]$ represent expected cost of executing a single run of component model $M_2$ to obtain an output $Y_2$. The value $g(\alpha)$ of the estimation variance $g(\alpha)/c$ is computed in accordance with equation (9) provided below:

$$g(\alpha)=(\alpha E[\tau_1]+\alpha E[\tau_2])\{Var[Y_2]+(2r_\alpha-\alpha r_\alpha(r_\alpha+1))Cov[Y_2,\tilde{Y}_2]\} \qquad (9),$$

wherein the value $(\alpha E[\tau_1]+\alpha E[\tau_2])$ represents cost per observation, wherein the value $\{Var[Y_2]+(2r_\alpha-\alpha r_\alpha(r_\alpha+1))Cov[Y_2,\tilde{Y}_2]\}$ represents contributed variance per observation, and wherein the value $r_\alpha$ is computed in accordance with equation (10) provided below:

$$r_\alpha=\lceil 1/\alpha \rceil \qquad (10).$$

In this specification, let $\alpha^*$ denote an optimal re-use factor. The optimal re-use factor $\alpha^*$ minimizes the estimation variance $g(\alpha)/c$ or, equivalently, maximizes an asymptotic efficiency measure $1/g(\alpha)$. The optimal re-use factor $\alpha^*$ is computed to a good approximation in accordance with equation (11) provided below:

$$\alpha^* = \left( \frac{E[\tau_2]/E[\tau_1]}{(Var[Y_2]/Cov[Y_2,\tilde{Y}_2])-1} \right)^{1/2}, \qquad (11)$$

and truncated at $1/n$ or 1 as needed to produce a feasible solution.

In practice, one or more statistics used on the right hand side of equation (11) are unknown a priori. For example, the statistic $E[\tau_1]$ may be unknown a priori. In this specification, let $c_1$ denote the statistic $E[\tau_1]$. Typically, the statistic $c_1$ depends on a vector $\beta$ of model parameters, wherein $\beta=(\beta_1, \beta_2, \ldots, \beta_d)$, and wherein $d \geq 1$, such that the statistic $c_1$ may be viewed as a function $c_1(\beta)$. Use of equation (11) may therefore require estimation of the function $c_1(\beta)$ for a given input $\beta$.

Figure 4A:
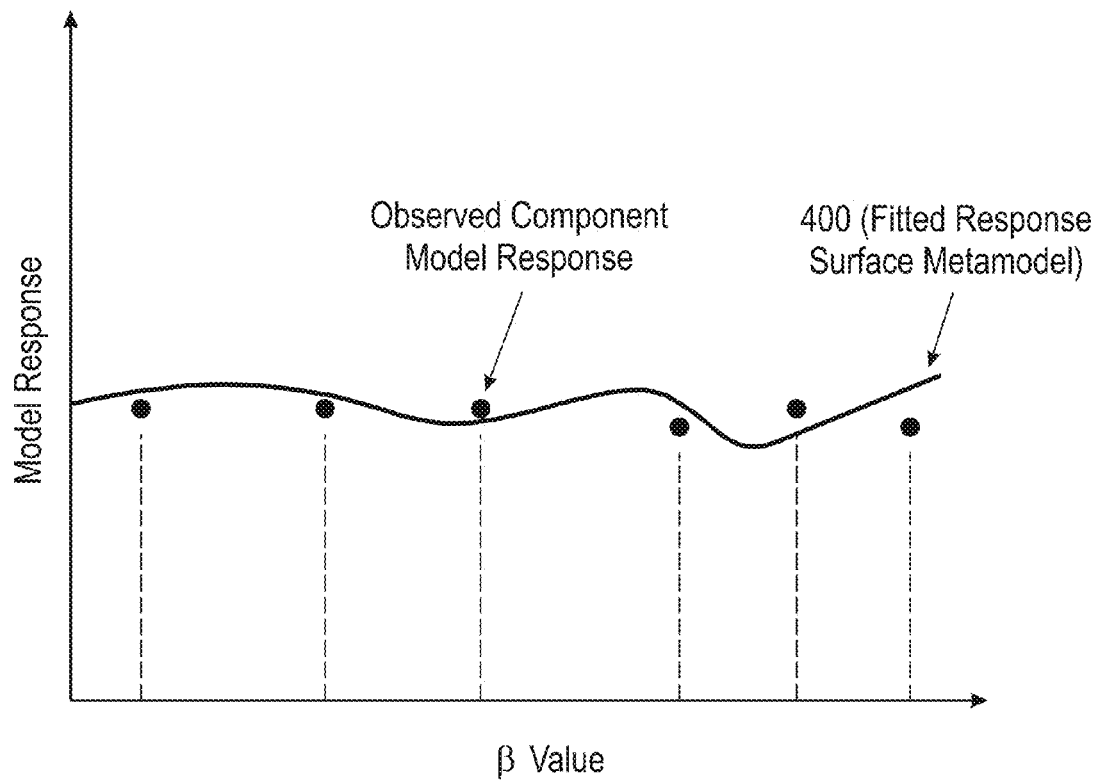
FIG. 4A illustrates an example one-dimensional representation of a fitted response surface metamodel.
Figure 4B:
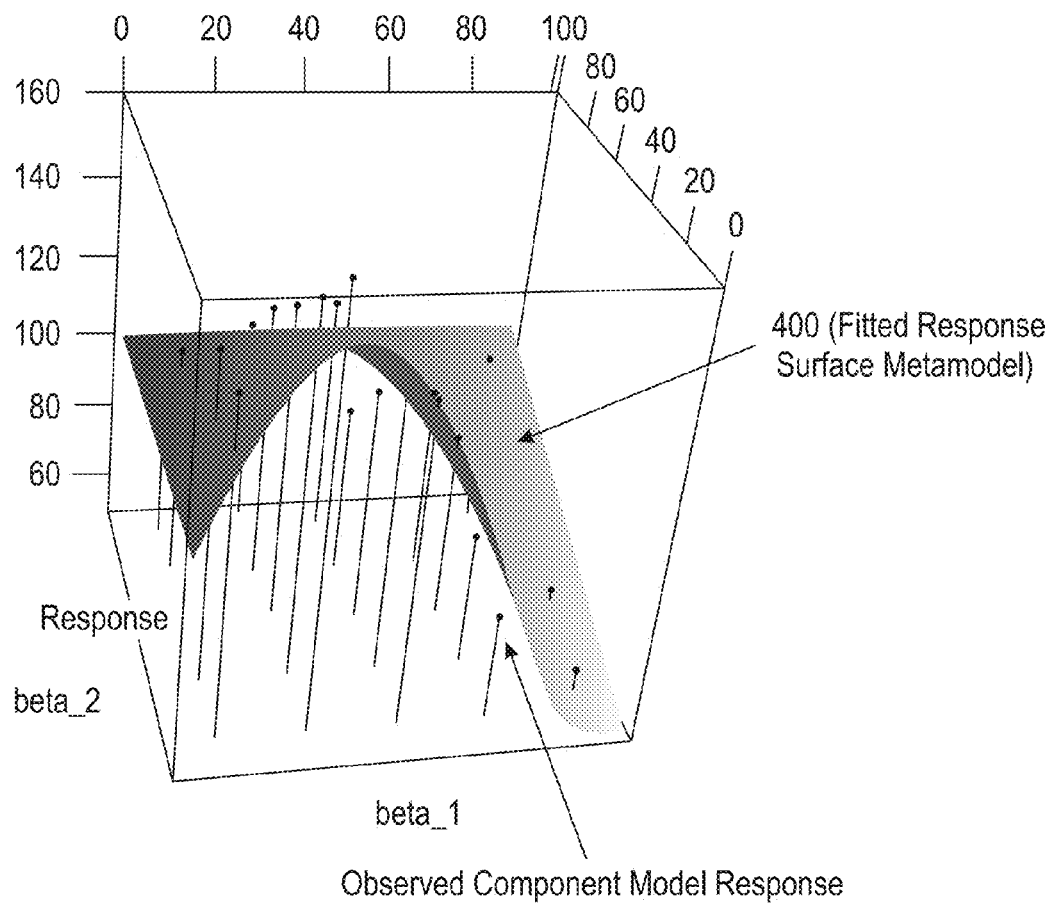
FIG. 4B illustrates an example two-dimensional representation of a fitted response surface metamodel.

In one embodiment, the function $c_1(\beta)$ is approximated based on $n_0$ prior observations $z_1=c_1^{(1)}(\beta^{(1)})$, $z_2=c_1^{(2)}(\beta^{(2)})$, ..., $z_{n_0}=c_1^{(n_0)}(\beta^{(n_0)})$ by developing a fitted response surface metamodel 400 (FIGS. 4A-4B) based on observed component model "response" $c_1(\beta)$ for given input $\beta$. FIG. 4A illustrates an example one-dimensional representation of the fitted response surface metamodel 400. FIG. 4B illustrates an example two-dimensional representation of the fitted response surface metamodel 400.

A variety of metamodeling techniques are known in the art, including polynomial approximation, stochastic kriging, and neural nets. The prior observations may be obtained from initial pilot runs of the component model $M_1$. In a composite modeling system, such as Splash, component models are re-used and metadata are stored for each component model. An additional or alternate source of prior observations may be obtained by maintaining execution costs for the component model $M_1$ as part of metadata that is stored for the component $M_1$, and subsequently retrieving this metadata. In a preferred embodiment, the metamodel itself is stored as part of metadata for the component model $M_1$, and is updated when the component model $M_1$ is run and new execution costs are observed.

One or more analogous techniques may be used to estimate one or more other statistics appearing on the right hand side of equation (11). For example, when an input $\beta$ is a time series instead of a single parameter or a vector of parameters, one embodiment of the invention obtains a low-dimensional representation of the time series as a vector of parameters. The low-dimensional representation may then be used in metamodeling, as described above. The low-dimensional representation may be obtained using one or more techniques known in the art, such as piecewise-linear approximation or recursive feature elimination on common principal components.

In some cases, a statistic c of interest is represented in accordance with equation (12) provided below:

$$c=E[g(\beta)]=\int g(\beta)\mu(d\beta) \qquad (12),$$

wherein g represents a specified function, and wherein $\beta$ represents a random value with probability distribution $\mu$. For example, the value $\beta$ may be an input to the component model $M_2$ and that corresponds to an output from the stochastic component model $M_1$. One embodiment of the invention uses the prior observations to approximate the probability distribution $\mu$ using one or more techniques known in the art, such as histogram or kernel density methods. Let $\hat{\mu}$ denote an approximation of the probability distribution $\mu$. Let $\hat{c}$ denote an approximation of the statistic c. The approximation $\hat{c}$ is computed in accordance with equation (13) provided below:

$$\hat{c}=\int g(\beta)\hat{\mu}(d\beta) \qquad (13).$$

Once the optimal re-use factor $\alpha^*$ is determined in accordance with equation (11) as provided above, the number n of simulation replications of the composite model M may be determined. In one embodiment, the number n is chosen such that the point estimator $\theta_n$ for $\theta$ estimates the true $\theta$ to within $\pm 100\epsilon\%$ with probability approximately $100(1-\delta)$ % for some specified values $\delta, \epsilon \in (0,1)$. The number n may be computed in accordance with equation (14) provided below:

$$n=h_{n_0}(\alpha^*) \times (z_\delta/(\epsilon\theta_{n_0}))^2 \qquad (14),$$

wherein the value $z_\delta$ represents the $$\left(\frac{1+\delta}{2}\right)$$

quantile of standard normal distribution (i.e., (mean 0, variance 1), and wherein the value $\theta_{n_0}$ represents a point estimator for $\theta$ determined in accordance in equation (4) as provided above and based on $n_0$ prior observations of outputs of the component model $M_2$. Further, for any n and $\alpha$, the value $h_n(\alpha)$ is computed in accordance with equation (15) provided below:

$$h_n(\alpha) = \left(\frac{1}{n}\right)\sum_{j=1}^{m_n} W_{n,j}^2, \qquad (15)$$

wherein, for each j, $W_{n,j}$ represents the sum of all centered outputs of the component model $M_2$, the outputs resulting from the component model $M_2$ taking as input the $j^{th}$ output of $M_1$, and each output of the component model $M_2$ is centered by subtracting the point estimator $\theta_n$. Similar to the estimation of statistics on the right hand side of equation (11) as described above, the $n_0$ prior observations may be obtained from pilot runs, metadata, or both.

In another embodiment, the number n is chosen as the maximum number of simulation replications of the composite model M that may be achieved within the fixed computational budget c. The number n may be computed in accordance with equation (16) provided below:

$$n = \lfloor c/(\alpha * E[\tau_1] + E[\tau_2]) \rfloor \qquad (16),$$

wherein $E[\tau_1]$ and $E[\tau_2]$ are estimated based on $n_0$ prior observations.

Figure 5:
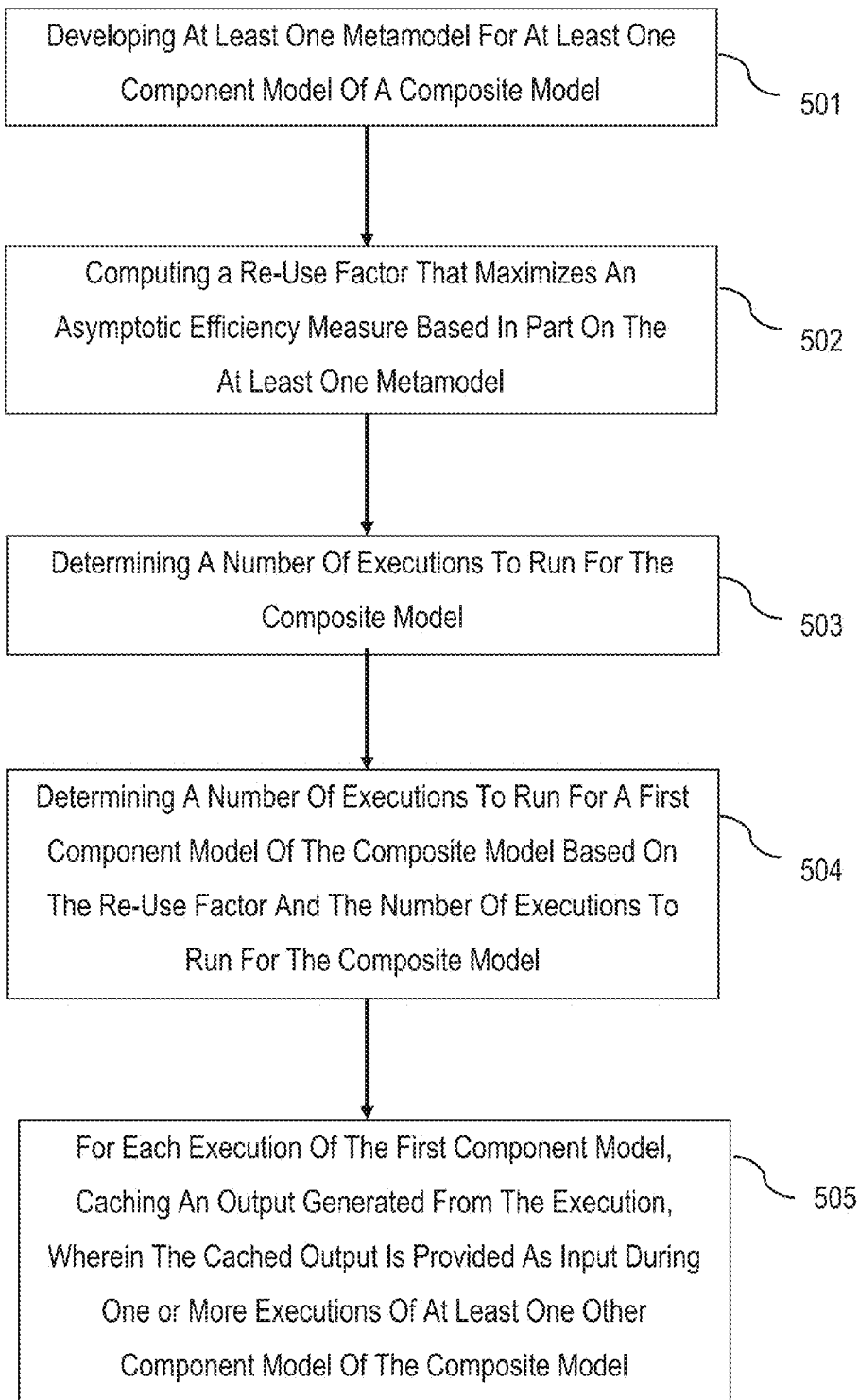
FIG. 5 illustrates a flowchart of an example process for result caching to improve the statistical efficiency of a composite model comprising a first component model and at least one other component model, in accordance with an embodiment of the present invention.

FIG. 5 illustrates a flowchart of an example process 500 for result caching to improve the statistical efficiency of a composite model comprising a first component model and at least one other component model, in accordance with an embodiment of the present invention. In process block 501, develop at least one metamodel for at least one component model of the composite model. In process block 502, compute a re-use factor that maximizes an asymptotic efficiency measure based in part on the at least one metamodel. In process block 503, determine a number of executions to run for the composite model. In process block 504, determining a number of executions to run for a first component model of the composite model based on the re-use factor and the number of executions to run for the composite model. In process block 505, for each of execution of the first component model, cache an output generated from the executions, wherein the cached output is provided as input during one or more executions of at least one other component model of the composite model.

In one embodiment, process blocks 501-504 may be executed utilizing the result caching unit 195. In one embodiment, process block 505 may be executed utilizing the cache unit 200.

Figure 6:
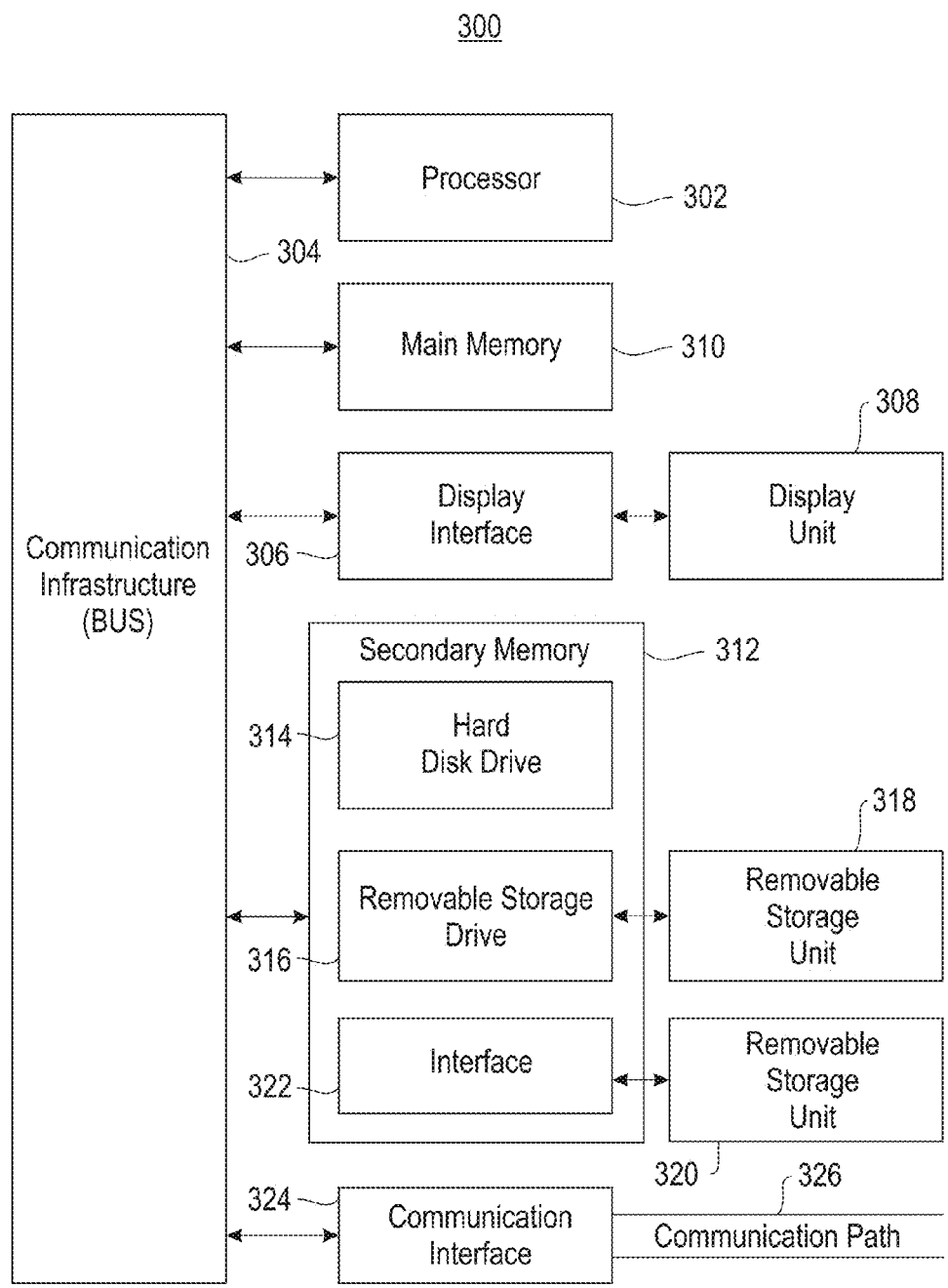
FIG. 6 is a high level block diagram showing an information processing system useful for implementing an embodiment of the present invention.

FIG. 6 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for result caching to improve the statistical efficiency of a composite model comprising a first component model and at least one other component model, the method comprising:

developing at least one metamodel for at least one component model of the composite model, wherein the at least one metamodel is based on prior observations of the at least one component model, and wherein the at least one metamodel approximates a statistical property of the at least one component model;

computing a re-use factor that maximizes an asymptotic efficiency measure based in part on the at least one metadmodel;

determining a number of executions to run for the composite model;

determining a number of executions to run for the first component model based on the re-use factor and the number of executions to run for the composite model, wherein the number of executions to run for the first component model is fewer than the number of executions to run for the composite model; and for each execution of the first component model, caching an output generated from the execution, wherein the cached output is provided as input during one or more executions of the at least one other component model.

2. The method of claim 1, wherein the statistical property of the at least one component model represents expected execution costs of the at least one component model.

3. The method of claim 2, wherein the expected execution costs incorporate costs of data transformations of each output generated from each execution of the first component model.

4. The method of claim 1, wherein the statistical property of the at least one component model represents statistical covariances between outputs generated from executions of the first component model and the at least one other component model.

5. The method of claim 1, wherein one or more cached outputs generated from executions of the first component model are cycled, such that each cached output is provided as input during at least one execution of the at least one other component model.

6. The method of claim 1, wherein the number of executions to run for the composite model estimates an expected value of a particular performance measure of interest for a given computational budget within a specified confidence interval with a specified probability.

7. The method of claim 1, wherein the particular performance measure of interest is one of the following: execution costs, profits, and reliability.

8. A system comprising a computer processor, a computer-readable hardware storage medium, and program code embodied with the computer-readable hardware storage medium for execution by the computer processor to implement a method for result caching to improve the statistical efficiency of a composite model comprising a first component model and at least one other component model, the method comprising:

developing at least one metamodel for at least one component model of the composite model, wherein the at least one metamodel is based on prior observations of the at least one component model, and wherein the at least one metamodel approximates a statistical property of the at least one component model;

computing a re-use factor that maximizes an asymptotic efficiency measure based in part on the at least one metadmodel;

determining a number of executions to run for the composite model;

determining a number of executions to run for the first component model based on the re-use factor and the number of executions to run for the composite model, wherein the number of executions to run for the first component model is fewer than the number of executions to run for the composite model; and for each execution of the first component model, caching an output generated from the execution, wherein the cached output is provided as input during one or more executions of the at least one other component model.

9. The system of claim 8, wherein the statistical property of the at least one component model represents expected execution costs of the at least one component model.

10. The system of claim 9, wherein the expected execution costs incorporate costs of data transformations of each output generated from each execution of the first component model.

11. The system of claim 8, wherein the statistical property of the at least one component model represents statistical covariances between outputs generated from executions of the first component model and the at least one other component model.

12. The system of claim 8, wherein one or more cached outputs generated from executions of the first component model are cycled, such that each cached output is provided as input during at least one execution of the at least one other component model.

13. The system of claim 8, wherein the number of executions to run for the composite model estimates an expected value of a particular performance measure of interest for a given computational budget within a specified confidence interval with a specified probability.

14. The system of claim 8, wherein the particular performance measure of interest is one of the following: execution costs, profits, and reliability.

15. A computer program product comprising a computer-readable hardware storage medium having program code embodied therewith, the program code being executable by a computer to implement a method for result caching to improve the statistical efficiency of a composite model comprising a first component model and at least one other component model, the method comprising:

developing at least one metamodel for at least one component model of the composite model, wherein the at least one metamodel is based on prior observations of the at least one component model, and wherein the at least one metamodel approximates a statistical property of the at least one component model;

computing a re-use factor that maximizes an asymptotic efficiency measure based in part on the at least one metadmodel;

determining a number of executions to run for the composite model;

determining a number of executions to run for the first component model based on the re-use factor and the number of executions to run for the composite model, wherein the number of executions to run for the first component model is fewer than the number of executions to run for the composite model; and for each execution of the first component model, caching an output generated from the execution, wherein the cached output is provided as input during one or more executions of the at least one other component model.

16. The computer program product of claim 15, wherein the statistical property of the at least one component model represents expected execution costs of the at least one component model.

17. The computer program product of claim 16, wherein the expected execution costs incorporate costs of data transformations of each output generated from each execution of the first component model.

18. The computer program product of claim 15, wherein the statistical property of the at least one component model represents statistical covariances between outputs generated from executions of the first component model and the at least one other component model.

19. The computer program product of claim 15, wherein one or more cached outputs generated from executions of the first component model are cycled, such that each cached output is provided as input during at least one execution of the at least one other component model.

20. The computer program product of claim 15, wherein the number of executions to run for the composite model estimates an expected value of a particular performance measure of interest for a given computational budget within a specified confidence interval with a specified probability.

* * * * *